United States Patent [19]
Squilla et al.

[11] Patent Number: 6,123,362
[45] Date of Patent: Sep. 26, 2000

[54] SYSTEM AND METHOD OF CONSTRUCTING A PHOTO COLLAGE

[75] Inventors: John R. Squilla, Rochester; Stephen L. Shaffer, Penfield; John K. McBride, Rochester, all of N.Y.

[73] Assignee: Eastman Kodak Company, Rochester, N.Y.

[21] Appl. No.: 09/178,696

[22] Filed: Oct. 26, 1998

[51] Int. Cl.[7] .............................. B42D 3/00; B42D 15/00; H04N 5/76; H04L 9/00
[52] U.S. Cl. ................................. 283/67; 281/31; 281/37; 380/21; 380/20; 358/335
[58] Field of Search .................................. 281/19.1, 19.2, 281/17, 29, 36, 37, 15.1, 31, 2; 380/21, 20; 358/335; 382/284

[56] References Cited

U.S. PATENT DOCUMENTS

| | | | |
|---|---|---|---|
| 1,378,063 | 5/1921 | Swick ........................................... | 281/2 |
| 1,670,254 | 5/1928 | Gown ........................................... | 281/2 |
| 4,172,332 | 10/1979 | Holes et al. .............................. | 281/31 |
| 4,538,833 | 9/1985 | Trikilis ........................................ | 281/2 |
| 4,583,763 | 4/1986 | Shacklett, Jr. ............................. | 281/2 |
| 4,586,729 | 5/1986 | Beylerian .................................... | 281/2 |
| 4,714,275 | 12/1987 | Eagle et al. ........................... | 281/15 R |
| 4,888,648 | 12/1989 | Takeuchi et al. ...................... | 358/335 |
| 4,906,024 | 3/1990 | Lein ............................................ | 281/2 |
| 5,041,921 | 8/1991 | Scheffler .................................. | 360/13 |
| 5,126,779 | 6/1992 | Maitani .................................... | 354/442 |
| 5,128,525 | 7/1992 | Stearns et al. .......................... | 235/454 |
| 5,246,519 | 9/1993 | McCormick ............................. | 156/247 |
| 5,285,438 | 2/1994 | Marchand et al. ...................... | 369/103 |
| 5,403,138 | 4/1995 | Oatke et al. ................................ | 412/4 |
| 5,418,654 | 5/1995 | Scheffler .................................. | 360/13 |
| 5,440,401 | 8/1995 | Parulski et al. ......................... | 358/342 |
| 5,454,678 | 10/1995 | Hefty .......................................... | 412/1 |
| 5,524,932 | 6/1996 | Kalisher .................................... | 283/67 |
| 5,605,354 | 2/1997 | Kwon ..................................... | 281/22 X |
| 5,608,542 | 3/1997 | Krache et al. .......................... | 358/449 |
| 5,634,667 | 6/1997 | Jordan ....................................... | 281/29 |
| 5,636,292 | 6/1997 | Rhoads .................................... | 382/232 |
| 5,636,957 | 6/1997 | Hefty .......................................... | 412/1 |
| 5,784,461 | 7/1998 | Shaffer et al. ............................. | 380/21 |

OTHER PUBLICATIONS

U.S. application No. 08/565,804, Daly et al., filed Nov. 30, 1995.

U.S. application No. 09/120,648, Squilla et al., filed Jul. 22, 1998.

U.S. application No. 09/136,395, Shaffer, filed Aug. 19, 1998.

*Primary Examiner*—Willmon Fridie, Jr.
*Assistant Examiner*—Alisa Thurston
*Attorney, Agent, or Firm*—James D. Leimbach

[57] ABSTRACT

A method of constructing a photo collage wherein a plurality of digital images are provided in a low resolution format on sticker sheets that have a unique identifier that cross references the reduced resolution images digital images with a high resolution version that is stored in a data base. A page layout form is provided such that a plurality of pages each having a plurality of layouts on which to position the low resolution image stickers. The sticker sheet pages are loaded with low resolution stickers for creating the pages of the photoalbum by arranging the stickers in a desired manner on a page layout form resulting in one of the page layouts being used for each of the pages. The images on the page layout form is then correlated to the high resolution version of the images stored in the database to retrieve a high resolution version of the photo collage which is then produced using conventional photofinishing techniques.

20 Claims, 8 Drawing Sheets

FIG. 5

SYSTEM AND METHOD OF CONSTRUCTING A PHOTO COLLAGE

CROSS-REFERENCE TO RELATED APPLICATION(S)

Reference is made to commonly assigned copending application Ser. No. 09/178,804, entitled "System and Method of Constructing a Photo Album" and filed on Oct. 26, 1988 in the names of John R. Squilla, Stephen L. Shaffer, and John K. McBride, which is assigned to the assignee of this application.

FIELD OF THE INVENTION

The invention relates generally to the field of photography, and in particular to photo collections. More specifically, the invention relates to a method of generating a photo collage using reduced resolution sticker versions of a customer's photographs.

BACKGROUND OF THE INVENTION

Photographs, videos, and memorabilia collections are very commonly used to maintain memories and events that formed a part of a persons life. These collections serve to augment the human memory and enrich the process of sharing stories related to the memories. When organized, viewed and shared on a regular basis a collection of memory artifacts generates a large reward, enriching the lives of all involved. The nature of these collections is such that they grow steadily, event by event, year by year, and soon become large and difficult to manage. Collections of photos and memorabilia are considered one of the most important and valued possessions by most people. They are the first things that people think of when forced to flee their homes due to fire, flood or other natural disaster. These collections possess emotional value, even if they are rarely viewed, because the intrinsic need to preserve lives memories is strong and universal. Because of the relative importance of these memories to the persons involved, the prior art is replete with teachings that disclose organizational methods.

The most common manner of organizing these collections within the prior art is to place the photos, videos or memorabilia into either an album or a box. Common vinyl album pages provide the means to store and view between one and five standard sized photos per page. Creative people often spend hours carefully selecting and arranging photos, writing captions, clipping newspaper articles, and other memorabilia to create visual stories or scrapbooks. Once organized into groups or pages these photocollages greatly enhance a person's ability to remember and share the story surrounding the depicted events. These simple organization tools allow the collections to be easily viewed and also serves to protect the artifacts themselves. There are numerous types of albums and boxes available in the market today, ranging from simple vinyl sleeves to boxes manufactured from specialized materials designed to preserve the artifacts. Album vendors include Pioneer Photo Albums, Design Vinyl and Cason-Talens. Box vendors include Exposures. None of these prior art disclosures provide a means by which a photocollage of these memorable events can be easily constructed by persons to who these event means so much.

As used herein photocollage refers to a single page having a plurality of images, such as a page in a photo album, a composite image having a number of images relating to a single theme such as a vacation, wedding, birthday party or the like. The concept of photocollage as used herein also includes the concept of a bound photo album having a plurality of pages, one or more of which is a photocollage.

Despite the fact that many people are engaged in collecting these memorable artifacts, few people have the free time available to invest on a regular basis to organize and maintain them. Before long, the amount of unorganized material becomes a significant psychological barrier to getting organized. Other barriers exist which prevent people from actively maintaining these memorabilia collections such as confidence in their process, access to the materials, or remembering the details about the event. Often, once people get started on this organizational task they find it rewarding and fun, but still a significant amount of work.

Many attempts have been made to provide tools for working with or organizing photo and memorabilia collections. Computer software programs such as Picture-It™, by Microsoft, or Creative Photo Albums™, by Dog Byte Development, allow people to work with digital versions of their photos and create digital versions of an album or print them on a home printer. Software products such as these require that each photo or artifact exist in digital form before they can be used. Although these products increase the ability to change and enhance photos and scanned memorabilia they do not reduce the amount of work needed to organize collections or create visual stories. Other services such as Photo-Net™ by Picture Vision™ will scan photographs in a high-quality format at the time of photo processing and provide a thumbnail image of the scanned images via the Internet. A customer, using these scanned images can create collections of photos which can be viewed on the Internet or have prints generated. Currently some of these services do not allow for the arrangement of several photos on a page and are limited to consumers who have a collection of digital images and a computer connected to the Internet and who are both computer and web literate.

Prior art disclosures as represented by previously filed applications under dockets 78258 for "A SYSTEM AND METHOD OF CONSTRUCTING PHOTO ALBUMS WITH STICKERS" and 78119 for "A SYSTEM AND METHOD FOR CONSTRUCTING PHOTO ALBUMS" assigned commonly with the present invention have taught the creation of photo albums by using, as a selection device, reduced resolution versions of images requiring less storage space than the full resolution versions. The prior art has also taught the use of these reduced resolution images in generation of photo albums and photocollages via thumbnail sketches and stickers that are uniquely identified with their high resolution counterparts that are contained in a data base. However, these prior art disclosures did not provide any methodology whereby, the photo albums to be created can have their exact layout selected by the customer.

It should be apparent from the foregoing discussion that there remains a need within the art for a method by which consumers can create photo albums and have them made for them in a previously selected manner that is as simple as ordering prints.

SUMMARY OF THE INVENTION

The present invention addresses the foregoing discussed shortcomings in the prior art by providing a method for creating photo albums wherein the individual pages are created as a series of photocollages from stickers. Each of the stickers has a low resolution version of an image with a unique identifier correlating the sticker to a high resolution version of the image that can be quickly accessed from a database file. The stickers fit on layout sheets that are provided for the photoalbum to be created. The layout sheets are provided to enable the user a selection of potential layouts for each page of the photoalbum. Accordingly, the present invention addresses the need for an improved method of generating photo collages from consumer photographs whereby, the customer selects that exact orientation of the images that will comprise the photoalbum and that requires a minimum amount of effort but yields a high-quality product and is reasonably priced.

The present invention is directed to overcoming one or more of the problems set forth above. Briefly summarized, according to one aspect of the present invention, a method of constructing a photo collage includes the steps of providing a plurality of images; generating a sticker sheet of reduced resolution images from the full resolution digital images, the sticker sheet including a machine readable means for identifying the high resolution images to be included in the photo collage represented by the reduced resolution stickers; selecting one or more of the reduced resolution images on the sticker sheet; placing the reduced resolution stickers onto a page layout sheet which indicates size of the image on the page, number of images per page, and textual additions, reading the selected reduced resolution images on the page layout sheet with a scanner; and constructing a photo album, or a photocollage from the digital images represented by the selected reduced resolution images and layout sheets.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages: Allows the user to have (1) an easy method of choosing photos and laying them out as photocollages on pages for creating professional looking photo albums which can be previewed instantly, (2) duplication of the photo albums, and (3) keeping the photo albums as files for later use.

BRIEF DESCRIPTION OF THE DRAWINGS

FIG. 5 is a drawing showing the layout of a cover page for the photo album;

To facilitate understanding, identical reference numerals have been used, where possible, to designate identical elements that are common to the figures.

DETAILED DESCRIPTION OF THE INVENTION

Figure 1:
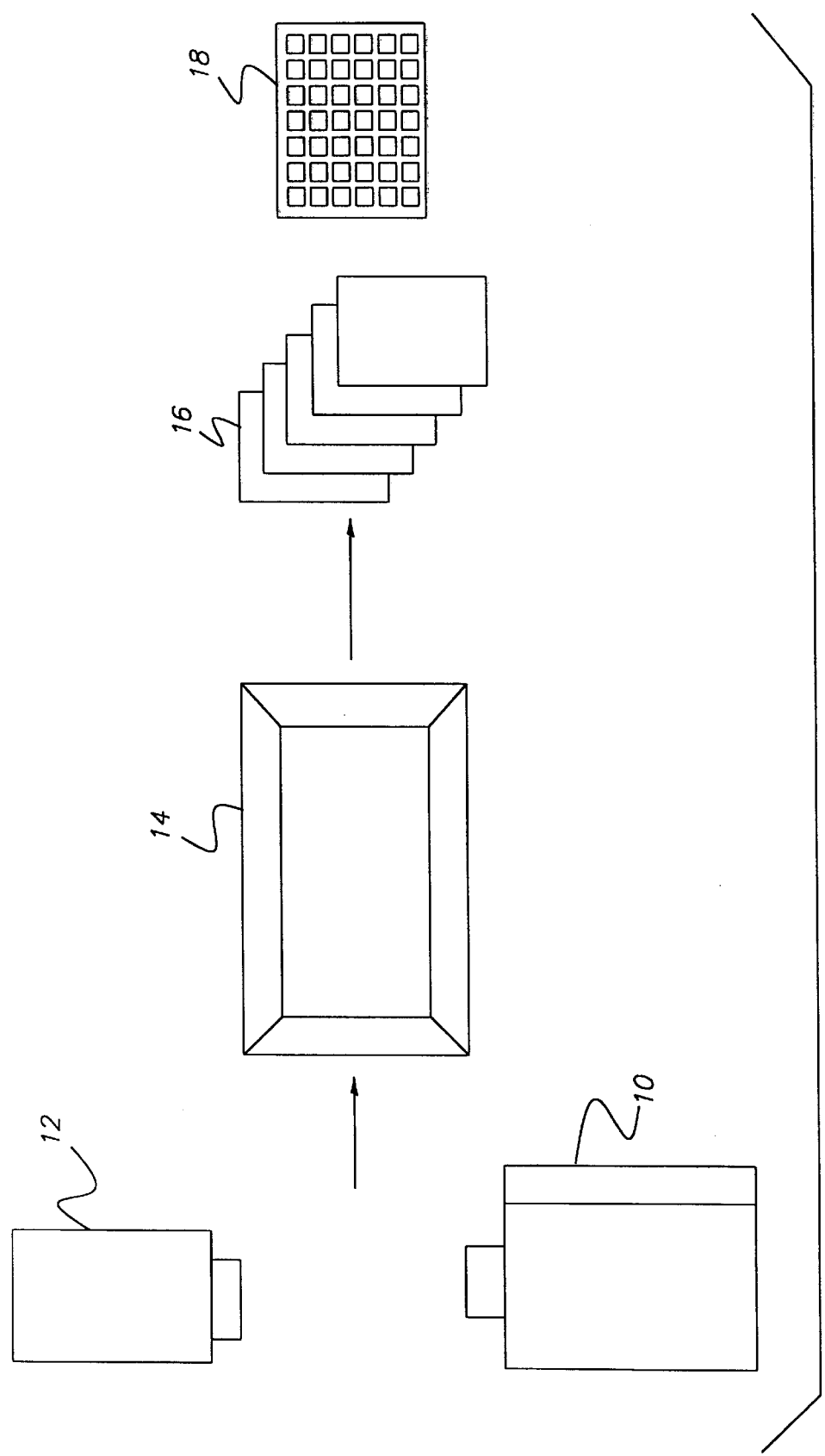
FIG. 1 is a block diagram showing the basic system elements to generate the sticker sheet useful for practicing the present invention.

We have discovered that a photo album or photocollage can be created in a simple and effective manner by supplying a reduced resolution sticker version of the developed pictures and a simple page/album ordering system. Referring to FIG. 1, a consumer sends their roll of exposed film 10 or Digital Still Camera memory cards 12 to a photofinisher 14, and the customer receives a set of prints 16 and a sticker sheet 18 that is to be used as a photocollage creation tool. The sticker sheet 18 has a reduced resolution version of each of the photographs from the roll 10 or the memory card 12.

Figure 2:
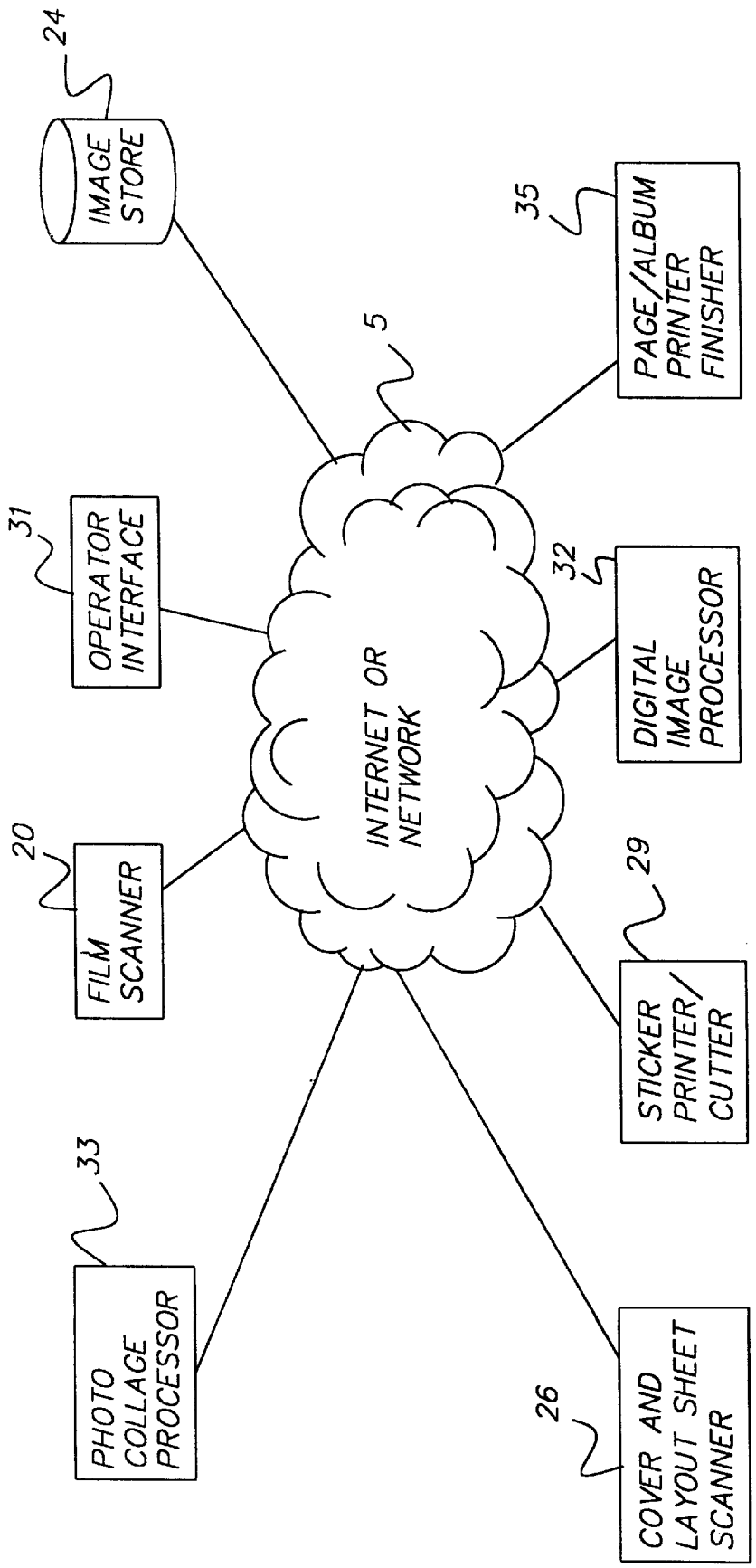
FIG. 2 is a system diagram showing a digital image processing system envisioned by the present invention.

Referring to FIG. 2, which is the system as envisioned by the present invention, viewed in conjunction with FIG. 1, conventional film processing takes place with potential correction of exposed photographs via operator interface 31. Operator intervention typically takes place once exposed photographs are seen as having incorrect brightness or color content. A preferred system will have, in addition to the printing apparatus typically employed by a photofinisher, a film scanner 20. At the photofinisher 14, exposed film images are chemically processed to generate an optical image. These optical images are then scanned using the digital film scanner 20 to produce a high resolution digital file that is archived in an image store 24. In general, to produce a high resolution printed image of 8×10 inch size a resolution of 1538×1024 pixels is required. The Digital Still Camera images from Digital Still Camera memory cards 12 are digitally processed to produce an equivalent digital image file of similar size. Once in usable digital form, both the film captured images and the Digital Camera captured images are then processed using a low-pass frequency filter and spatial sub-sampling to generate a reduced resolution version of the image. This processing technique is similar to that shown in the FlashPix toolkit on the Eastman Kodak World Wide Web site (www.kodak.com). These reduced resolution images are used to form a sticker sheet which is printed on sticker printer/cutter 29.

The original high-resolution images are archived in image storage 24 for future use. This archive of digital images would, in most cases, comprise a software database application and a large collection of optical or magnetic storage media. In order to allow for the future association of the high-resolution images with their corresponding reduced resolution thumbnail images, each image is assigned a unique identifier. There are a variety of means, known in the art, for the generation of this unique identification. One such means is disclosed in Townsend and Shaffer, U.S. Pat. No. 5,784,461, in which a combination of the customer identification information and the photofinishing location, equipment, and date and time are combined. Other means of unique identification could be employed so long as they provide a one-to-one association of a person to a single image. The assigned unique image identification is associated with both the high and reduced resolution versions of the image. The unique identifier embodiment can be any of either: embedded data contained within the pixels themselves, invisible ink, visible codes, histogram, color information, or the like. The reduced resolution images are further processed to generate a formatted array or sticker sheet 18.

Figure 3:
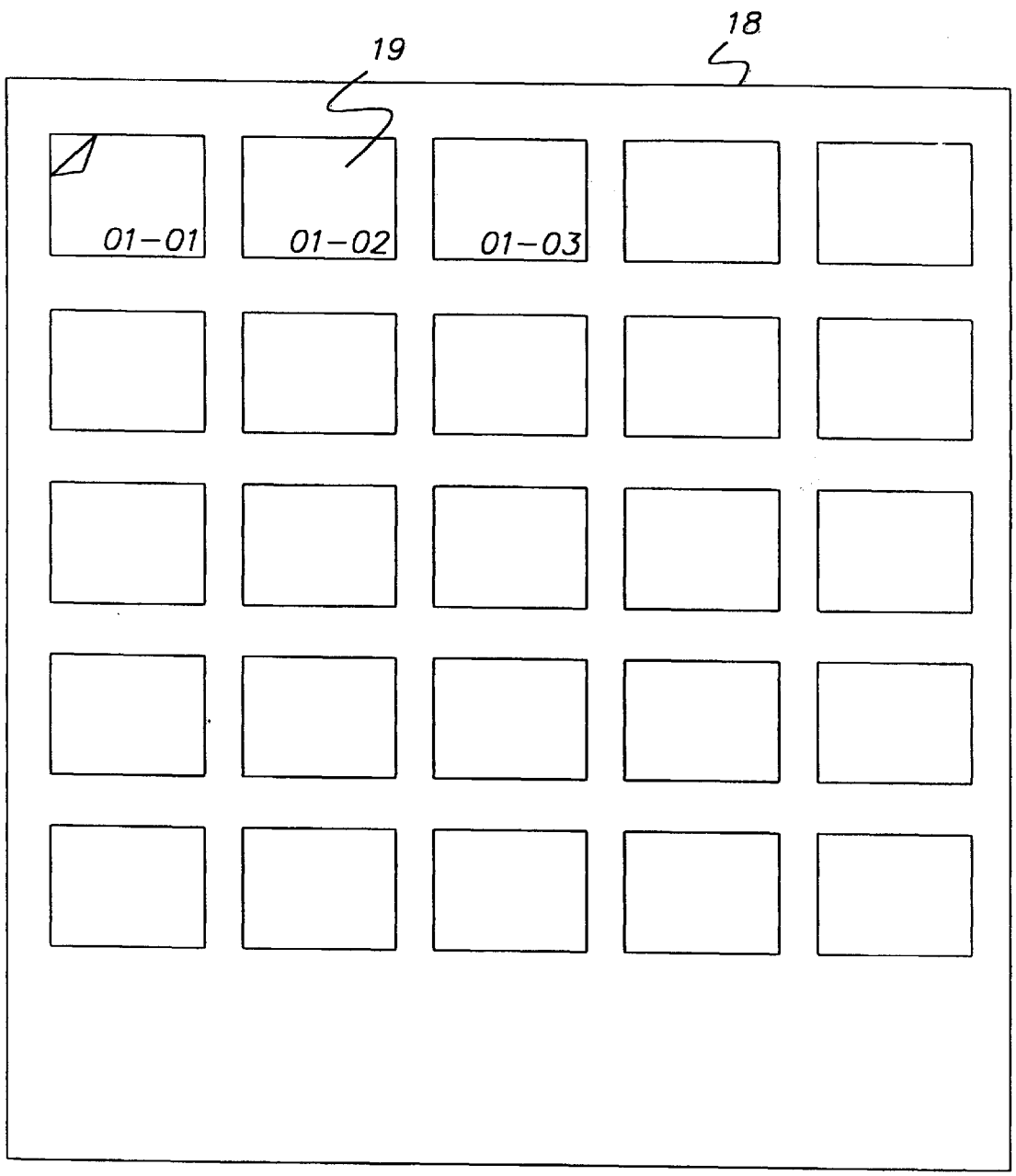
FIG. 3 is a drawing of a sticker sheet of reduced resolution images to be used with the present invention.

Referring to FIG. 3, the sticker sheet 18 also includes an alpha numeric human readable image identifier 19 which allows the user to locate the corresponding photographic print of the sticker sheet image. In addition a unique machine-readable image identification is also included in the printed sticker sheet. The machine readable image identification could take the form of a bar code, machine readable characters or any one of a number of data-encoding patterns. A preferred implementation this unique machine readable image identification is to embed it directly into the pixels of the thumbnail image using signal processing techniques. An example of such techniques can be seen in Daly et al. (U.S. Pat. No. 5,859,920 issued Jan. 12, 1999.

The method of embedding digital data in an image can be best considered in two stages; an encoding process and a decoding process. First, a multi-level data image is generated from digital data. The multi-level data image as described in detail below is an image having a constant background value and an array of spots on the background representing the digital data. The data image may be produced using digital image processing techniques, or may be produced optically for example by exposing spots on a photographic film. Next, the data image is convolved with an encoding carrier image to form a frequency dispersed data image. The encoding carrier image is preferably a rotationally symmetric, low amplitude, high frequency pattern employed to spatially disperse the data image to mask its visibility when added to the source image. Preferably the convolution is performed on a digital computer using a well known Fourier Transform method and digital versions of the data image and the encoding carrier image. The convolution may also be performed using a direct convolution algorithm on the digital computer. Alternatively, the convolution may be performed optically using well known optical convolution techniques and optical versions of the data image and the encoding carrier image. The frequency dispersed data image is then added to the source image to form a source image with embedded data. As described in more detail below, the addition may be performed either optically using traditional photographic processes, or digitally using a digital computer and digital versions of the source image and the frequency dispersed data image. If the addition is performed digitally, a hard copy version of the digital source image having embedded data may be produced using a digital printer such as a thermal, ink-jet, electrophotographic, or silver halide printer.

The digital data is recovered from the source image having embedded data by first cross correlating the source image having embedded data with a decoding carrier image to produce a recovered data image. Preferably, the decoding carrier image is identical to the encoding carrier image and the cross correlation is performed by a digital computer on digital versions of the source image having embedded data and the decoding carrier image. If a hard copy of the source image having embedded data is used, the hard copy is first scanned as described in detail below to produce a digital version. Alternatively, the cross correlation may be performed using well known optical techniques and optical versions of the source image having embedded data and the decoding carrier image. Finally, the digital data is extracted from the recovered data image. Preferably, the digital data is extracted from a digital version of the recovered data image using a pattern recognition process in a digital computer. Alternative methods for encoding data within an image can be found in issued U.S. Pat. Nos. 5,636,292; 5,128,525; 5,285,438; and 5,126,779 which can also be used with the present invention.

Figure 4:
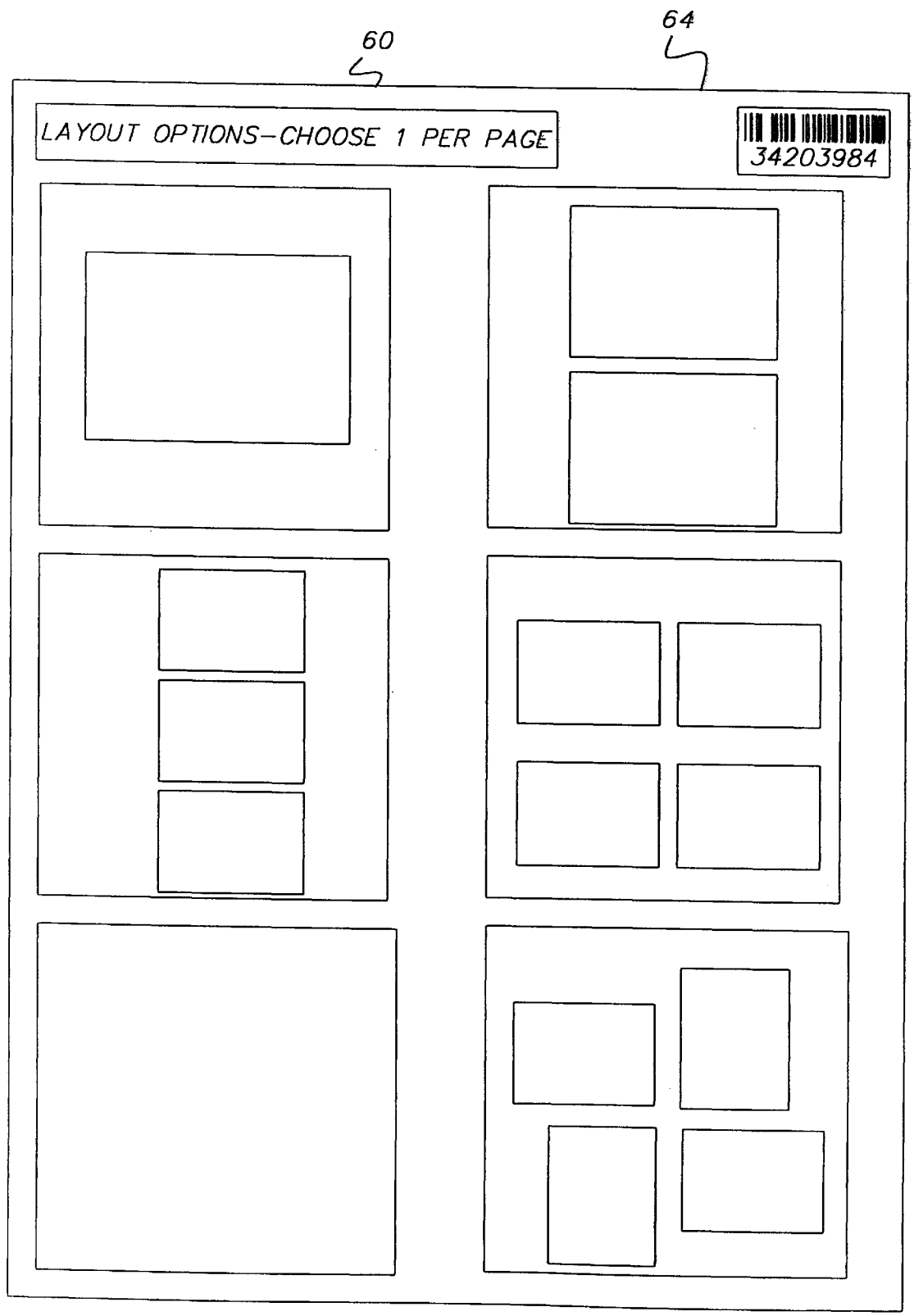
FIG. 4 is a drawing showing some of the layout styles available for a photocollage page within the photoalbum.
Figure 5:
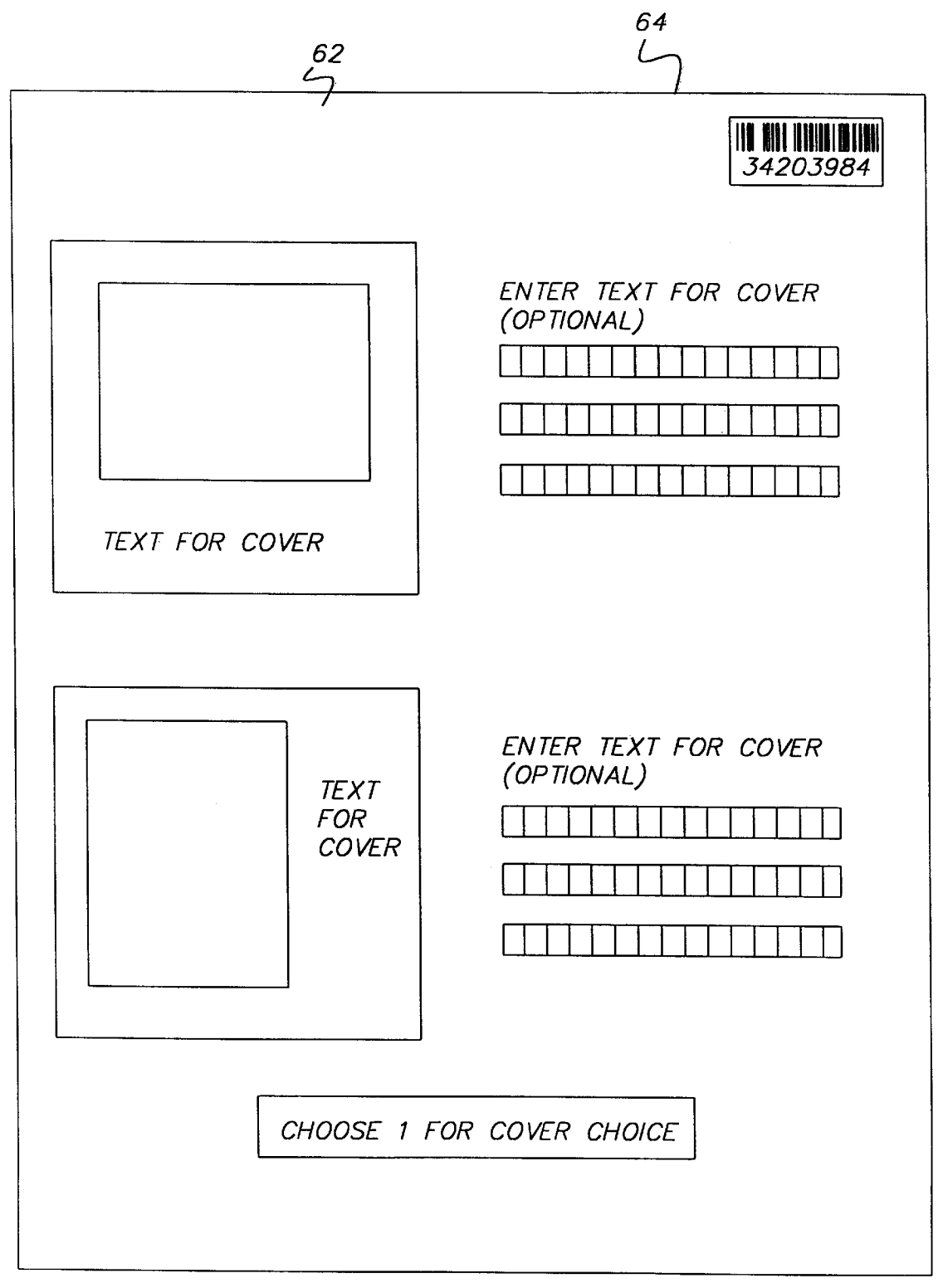

A customer wishing to construct a photocollage selects one or more images by peeling the sticker image from the sticker sheet 18 and placing it on the page layout form 60 as shown in FIG. 4. The page layout form 60 includes one or more scaled graphic depictions of the final page each comprising a unique page layout. In one embodiment each scaled page representation includes one or more graphic image boxes each of which is an allowable location to place a sticker. Different scale page layout representations depict the available album page layouts made available by the service. Normally this variety of page layout choices would include variety along the dimensions of: the number of images per page, the resulting size of the images on the final printed page, arrangements accommodating both portrait (vertical) and landscape (horizontal) captured original images, different final printed page sizes, provision for annotation text, different size original images including standard 35 mm, Advanced Photo System classic, HDTV and Panoramic images and, Digital Still Camera formats. Special page layouts would also be provided for cover pages 62 as shown in FIG. 5. The scale of the sticker images and the scale of the graphic image boxes on the page layout order form do not have to be the same. If the page layout form image box is larger than the sticker image the image is enlarged to fill the box when producing the final printed album page. If the page layout form image box is smaller than the sticker image the image is reduced to fill the box when producing the final printed album page. In this way a variety of final output sized images can be made available to the user without the need to produce multiple sizes of sticker images. The page layout form 64 and cover sheet would have identifiers on them so that the page type can be identified during the scanning process. Bar code or alphanumeric characters can be used for this identification. These page layout forms 60 can be themed to a particular place or event to allow for specialized, professional backgrounds, graphics, and images to be included in the photocollage. Examples of this are buildings, anniversaries, vacations, theme parks, visits, and others.

Once the selection has been made the consumer sends the completed page layout form(s) 60 and 62 to the photofinisher to have the photocollage prepared. The method of communicating the selection of the thumbnails on an sticker sheet further comprise the provision of electronic communication means for transmitting the contents of the sticker sheet including: a touch-tone phone, a facsimile transmission, or a touchpad connected to a computer.

The photocollage is created when the customer sends in the page layout and cover sheets with the stickers attached representing the desired images for the photocollage. The roll information, and the images to be used in the photocollage are identified by scanning the layout 60 and cover sheet 62 and using the cover and layout sheet scanner 26. Information about orders such as customer name, quantity, etc., are entered into the system via the operator interface 31.

Using the generated list of images the photocollage processor 33 finds and retrieves the corresponding high resolution images that were previously stored in the image storage 24 which are associated with the unique image identification numbers that were supplied by the scanned layout sheets 60 and 62. These high-resolution images are then assembled into a photocollage using a page description language or template following graphical rules. These graphical rules incorporate customer preferences such as size of the pages, background styles and colors, etc. In this page layout process it may be necessary to zoom and crop the images to optimize the layout or to match customer preferences.

FIG. 2 illustrates the preferred embodiment of the present invention wherein each of the components has an interface to a common network 5. Certain components will exist at the photofinishers such as the sticker sheet printer/cutter 29, the film scanner 20. Other subsets of the system would exist at multiple locations such as having a print shop with the page/album printer finisher 35 and a remote processing site providing services for the digital image processor 32.

Depending upon the method employed for rendering the image identification number within the sticker sheet a variety of image processing techniques would be employed. In the case of human readable image identification numbers optical character recognition software is employed that translates the scanned image of the characters to a digital number representation. In the case where the image identification was hidden within the pixels of the reduced resolution image, a reverse of the data embedding signal processing technique is employed. The images are processed to remove any rotation and scale variations introduced in the printing and scanning steps. The result of this processing is to generate a list of the identification numbers of the images which the customer desires to have placed into the photocollage.

Figure 6:
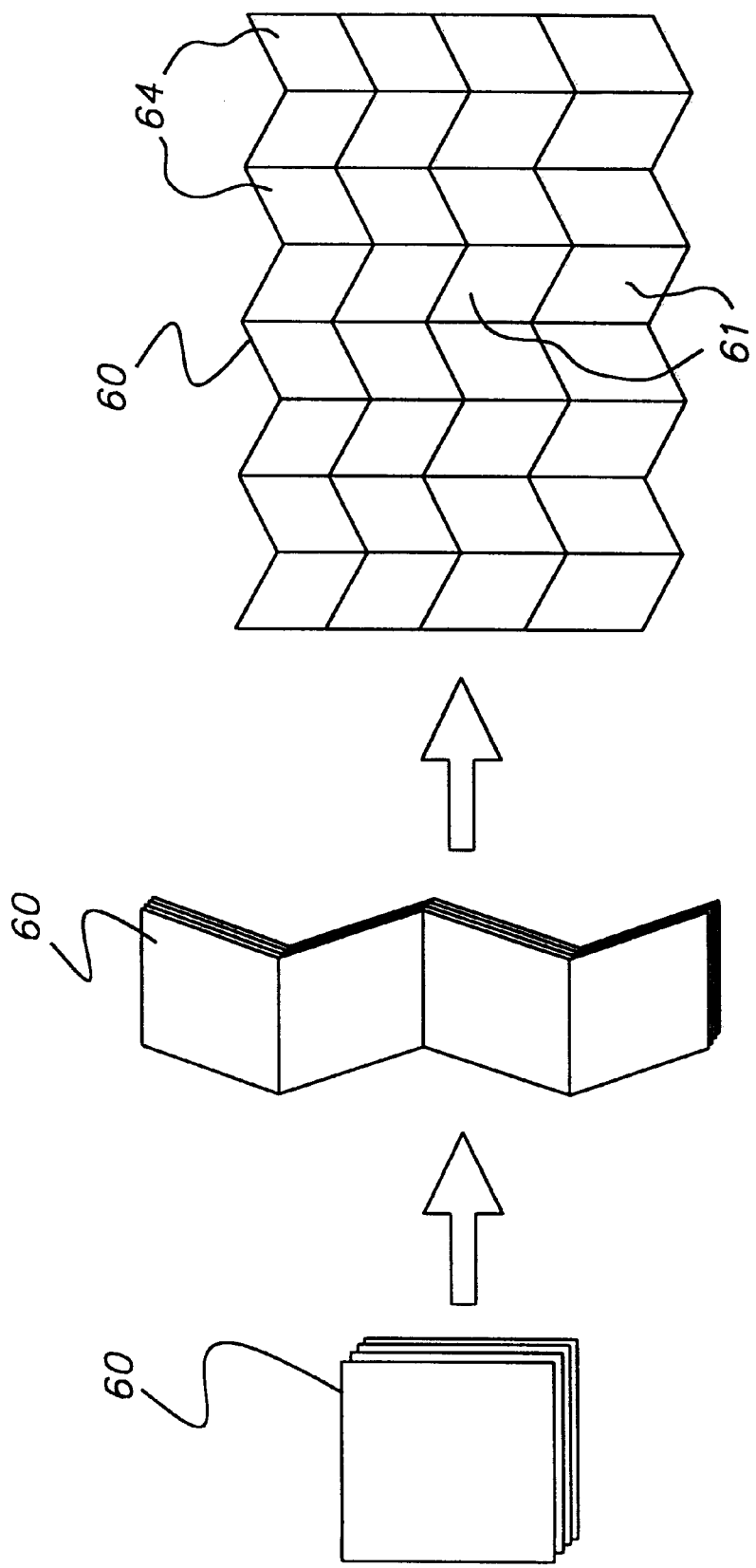
FIG. 6 illustrates the page layout form used in generating photo albums as envisioned by the present invention.

FIG. 6 illustrates a page layout form 60 that is used in conjunction with the index sticker employed by the method of constructing a photo album as envisioned by the present invention. The present invention as illustrated in FIG. 6 offers significant improvements including ease of use in reduction in the amount of materials handled over prior art methods for creating photo albums. The page layout form 60 provides a plurality of page layout form 64 each of which have a plurality of layouts 61 that can be selected for that page. The layouts 61 are arranged in columns within the preferred embodiment, each column having a plurality of different layouts. One of the layouts 61 is selected for each of the pages. Typically, the layout sheet 60 is used by placing the index stickers on one of the layouts 61 within each column to select the layout style that will be used by that page within the final photoalbum. These index stickers each have a low resolution image with a unique identifier that cross references each of the stickers to a high resolution version of the low resolution image contained on the stickers.

Figure 7:
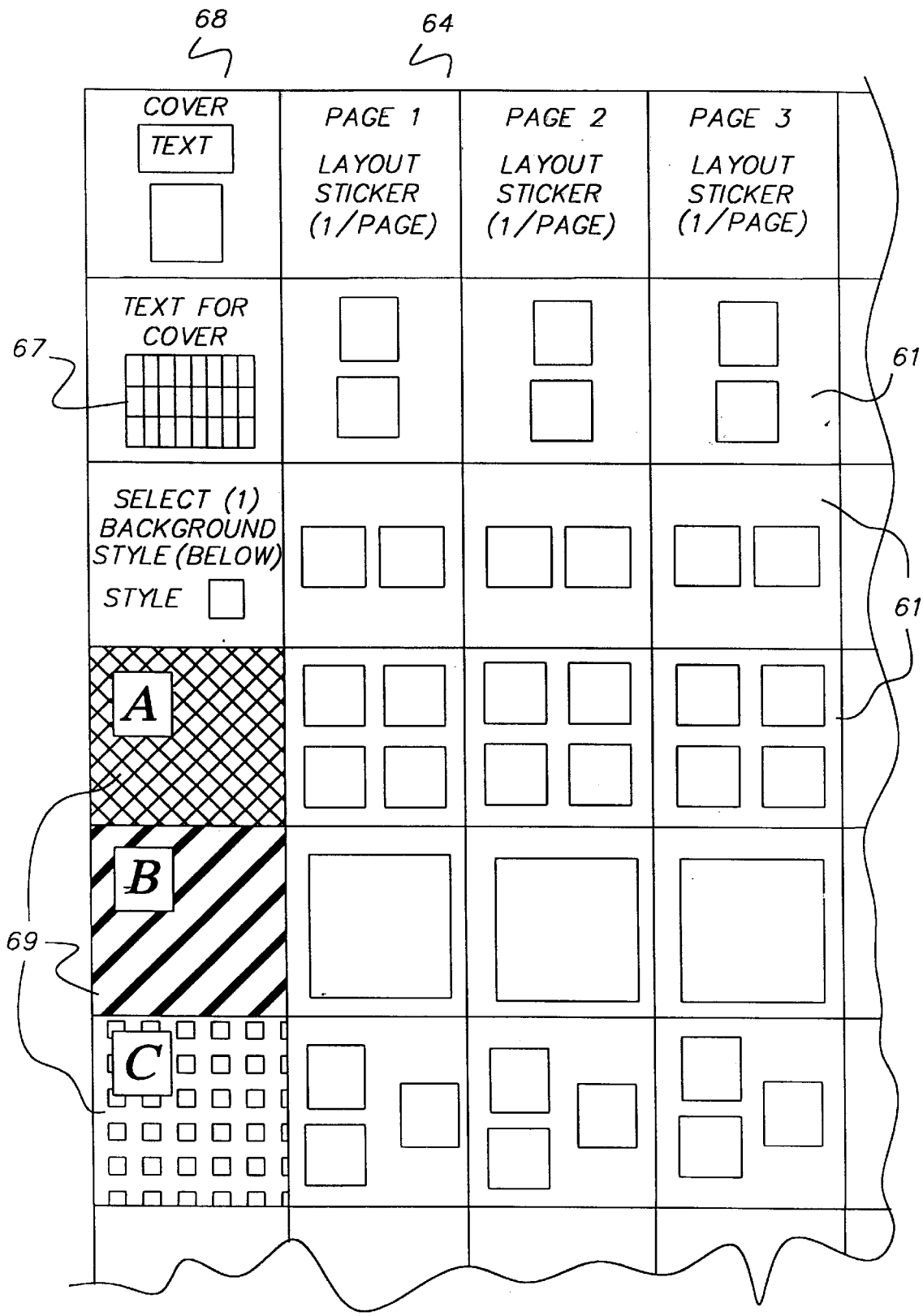
FIG. 7 is a more detailed illustration of the layout form shown in FIG. 6.

FIG. 7 is a enlarged illustration of the page layout form 6 shown in shown in FIG. 6 illustrating the various layouts that could conceivably be made available to be used in conjunction with the page layout form of FIG. 6. The page positioning form 60 has an initial page 65 that is used with the cover page 68. FIG. 7 illustrates a plurality of layouts 61, one of each being available for each of the page layout form 64. Additionally, a cover page 68 is provided having a text selection area 67 that can be used to place specified text on the cover of the album to be created. Cover page also has a selection of backgrounds 69 that can be used in addition to any particular image that is selected for the cover. The backgrounds can be chosen such that a single background is used throughout the album or different backgrounds can be used on different pages within the album.

Figure 8:
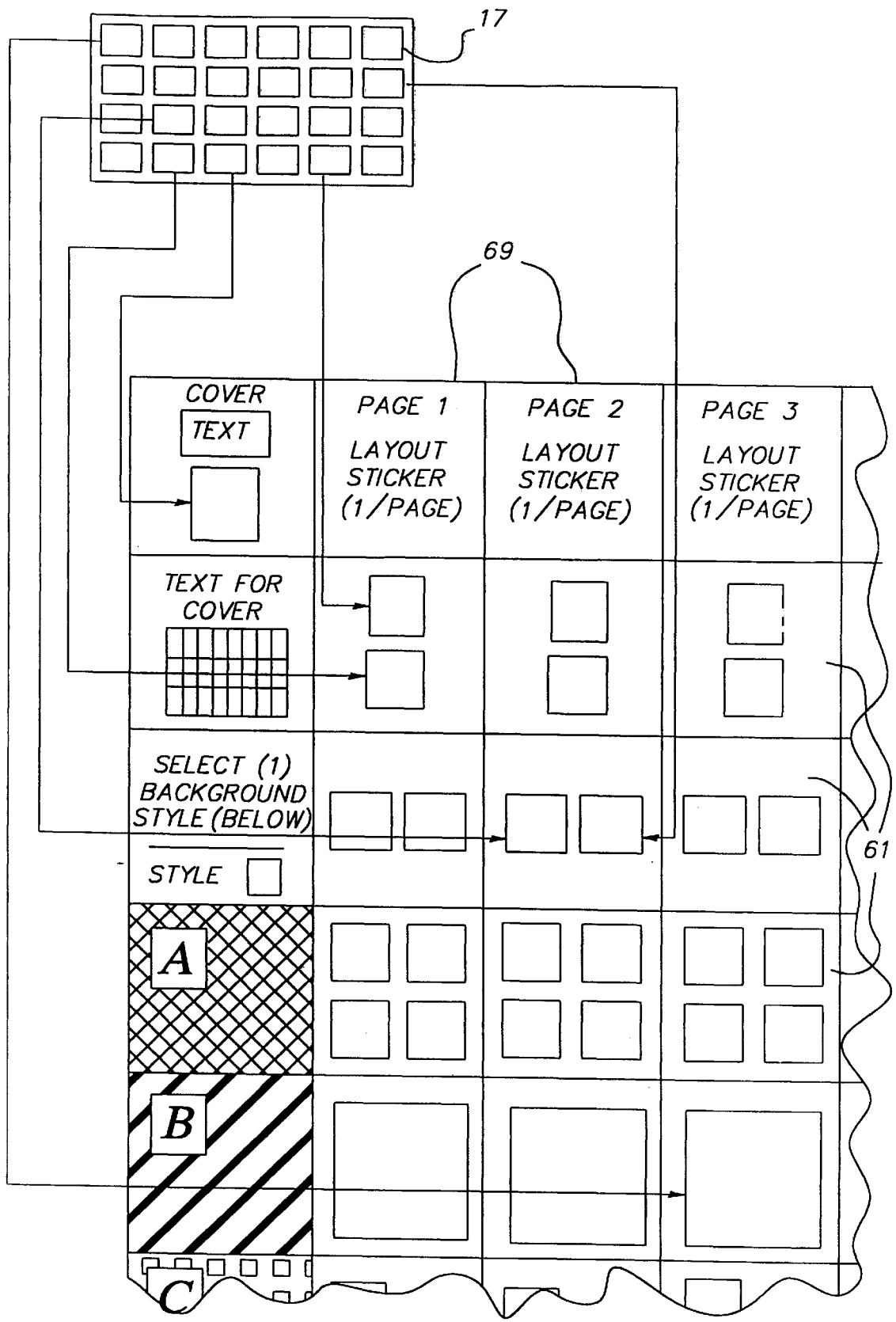
FIG. 8 is an illustration showing the placement of stickers on the layout form.

Referring now to FIG. 8 to quickly surmise the present invention, a sticker sheet similar to that shown in FIG. 3 having a plurality of stickers 17 each with an individual low resolution image as previously discussed is used to provide the images that will be arranged within the page layout form 64 in a manner similar to that shown in FIG. 8. The page layouts 61 that are available for each of the page layout form 64 allow the user to select the desired placement of the images in each page of the photoalbum. A typical layout is shown in FIG. 8 by the arrows placing the stickers 17 on the various layouts 61.

Additional stickers can be provided representing stock images from, theme parks, national monuments and other popular topics that can be incorporated within the photocollage via the layout sheets. This allows the customer to use professional content to augment the appearance and value of the photocollages. High resolution representations of these additional content stickers would also have to be contained within an image database and would require unique identifiers similar to the personal images.

The invention has been described with reference to a preferred embodiment. However, it will be appreciated that variations and modifications can be effected by a person of ordinary skill in the art without departing from the scope of the invention.

PARTS LIST

5 Internet or network
10 exposed film
12 memory cards
14 photofinisher
16 prints
18 sticker sheets
19 numeric identifier on stickers
20 film scanner
24 image storage
26 sticker sheet scanner
29 sticker printer/cutter
31 operator interface
32 digital image processor
33 photocollage processor
35 printer finisher
60 page layout form
61 pagelayout
64 page layout form
67 text area on cover sheet
68 cover sheet
69 background styles

What is claimed is:

1. A method of constructing a photo collage, comprising:
    a) providing a plurality of index stickers each of the stickers having a low resolution image with a unique machine readable identifier embedded within pixels of the index stickers that cross references the sticker to a high resolution version of the low resolution image, and a page layout form having a plurality of pages with a plurality of different layouts provided for each of the pages; and
    b) placing the index stickers on the pages of the layout form.

2. The method of claim 1 wherein the step of providing further comprises providing the page layout form on a medium such that each of the pages can be folded on top of one another and each of the layouts can be folded on top of one another.

3. The method of claim 1 wherein the step of providing further comprises providing the page layout form such that it is a single piece with folds separating the page positions.

4. The method of claim 1 wherein the providing step further comprises providing on the layout form a cover page position.

5. The method of claim 4 wherein the step of providing further comprises the step of providing a set of graphic arts to be used as part of the cover page.

6. The method of claim 4 wherein the step of providing further comprises the step of providing a text entry area to be used in conjunction with the cover page.

7. The method of claim 1 wherein the step of providing further comprises providing the high resolution version on a database.

8. The method of claim 7 further comprising the step of retrieving the high resolution from the database and creating the photoalbum in accordance with the index stickers on the page layouts and the page layouts on the page positions.

9. A method of creating photocollages comprising the steps of:
    a) acquiring a high resolution digital version for each of a plurality of images;

b) storing the high resolution digital images;

c) creating a plurality of stickers having a reduced resolution version from the high resolution digital version with a unique identifier that associates the reduced resolution version with its high resolution counterpart;

d) generating a page layout form having a plurality of page positions, each of the page positions having a plurality of page layouts such the stickers can be arranged in a variety of desired fashions on the page layout form;

e) placing the plurality of stickers on the page layout forms such that one page layout is used for each of the page positions;

f) retrieving the high resolution versions of the images by associating the unique identifier on the plurality of stickers with its high resolution counterpart; and g) creating the photo collage with the retrieved high resolution images such that the photo collage has a layout that corresponds to the page layout form.

10. The method of claim 9 wherein the generating step generates the page layout form such that it is themed to a specific topic.

11. The method of claim 9 wherein the step of creating further comprises means for adding additional stickers for a plurality of events selected from a library of images.

12. A system for constructing a photo collage comprising:

a plurality of index stickers each having a low resolution image with a unique machine readable identifier embedded within pixels of the index stickers that cross references each of the stickers to a high resolution version of the low resolution image; and a page layout form having a plurality of pages, each of the pages having a plurality of page layouts.

13. The system of claim 12 wherein the page layout form further comprises a flexible medium that allows the pages to fold on top of one another and the page layouts to fold on top of one another.

14. The system of claim 12 wherein the page layout is formed such that it has folds separating each of the page positions.

15. The system of claim 9 further comprising means for adding additional stickers to the sticker sheet comprised of images relevant to one of a plurality of events selected from a library of images.

16. The system of claim 9 further comprising a cover page as the initial page position.

17. The system of claim 16 wherein the index stickers further comprise a set of graphic arts to be used as part of the cover page.

18. The system of claim 16 wherein the cover page further comprises means for providing a text entry area to be used in conjunction with the cover page.

19. The system of claim 9 further comprising a data base for storage of the high resolution version.

20. The system of claim 19 further comprising means for retrieving the high resolution version from the database and creating the photoalbum in accordance with the index stickers on the page layout form.

\* \* \* \* \*